United States Patent
Glaser

(10) Patent No.: US 7,950,285 B2
(45) Date of Patent: May 31, 2011

(54) PRESSURE SENSOR FOR MEASUREMENTS IN HOT, DYNAMIC PROCESSES

(75) Inventor: Josef Glaser, Graz (AT)

(73) Assignee: Kistler Holding AG, Winterthur (CH)

( * ) Notice: Subject to any disclaimer, the term of this patent is extended or adjusted under 35 U.S.C. 154(b) by 52 days.

(21) Appl. No.: 12/447,500

(22) PCT Filed: Nov. 12, 2007

(86) PCT No.: PCT/CH2007/000557
§ 371 (c)(1),
(2), (4) Date: Apr. 28, 2009

(87) PCT Pub. No.: WO2008/055377
PCT Pub. Date: May 15, 2008

(65) Prior Publication Data
US 2010/0050775 A1    Mar. 4, 2010

(30) Foreign Application Priority Data
Nov. 10, 2006    (AT) ................. A 1866/2006

(51) Int. Cl.
*G01L 7/00*    (2006.01)
(52) U.S. Cl. .................................................. 73/706
(58) Field of Classification Search .............. None
See application file for complete search history.

(56) References Cited

U.S. PATENT DOCUMENTS

| | | | | |
|---|---|---|---|---|
| 3,857,287 | A | * | 12/1974 | Sonderegger et al. .......... 73/706 |
| 4,982,608 | A | | 1/1991 | Märki et al. |
| 5,353,643 | A | * | 10/1994 | Glaser ............................. 73/708 |
| 5,939,636 | A | | 8/1999 | Glaser |
| 6,938,491 | B2 | * | 9/2005 | Clark et al. ...................... 73/753 |
| 7,779,700 | B2 | * | 8/2010 | Motoyama ....................... 73/717 |
| 2004/0206186 | A1 | * | 10/2004 | Clark et al. ..................... 73/753 |
| 2009/0308167 | A1 | * | 12/2009 | Motoyama ....................... 73/717 |
| 2010/0050775 | A1 | * | 3/2010 | Glaser ............................. 73/708 |

FOREIGN PATENT DOCUMENTS

| | | |
|---|---|---|
| DE | 1900970 | 11/1969 |
| DE | 8903667 | 6/1989 |
| DE | 29716060 | 12/1997 |
| EP | 1498599 | 1/2005 |

OTHER PUBLICATIONS

English translation of International Preliminary Examination Report on Patentability, issued Jun. 10, 2009.

* cited by examiner

*Primary Examiner* — Andre J Allen
(74) *Attorney, Agent, or Firm* — Dority & Manning, P.A.

(57) ABSTRACT

The invention relates to a pressure sensor for measurements in hot, dynamic processes. The pressure sensor comprises a cylindrical housing in which a measuring element is located, and a round or annular membrane having at least one outer support. The outer support is arranged on the housing, offset behind a housing extension. The measuring element is adapted to acquire measurement data as a result of an axial displacement of the membrane. The housing extension is provided with a heat shield which is arranged, except on its edges, interspaced behind a gap.

7 Claims, 1 Drawing Sheet

PRESSURE SENSOR FOR MEASUREMENTS IN HOT, DYNAMIC PROCESSES

CROSS-REFERENCE TO RELATED APPLICATIONS

Figure 1:
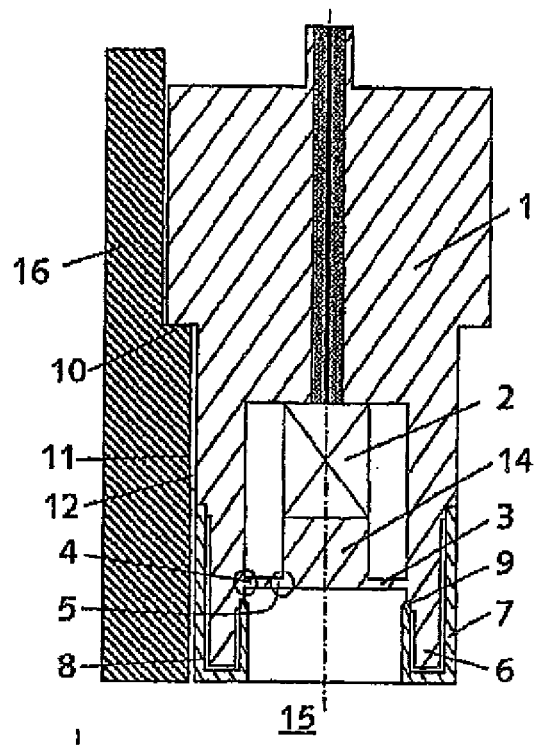

This application claims priority to International Application Ser. No. PCT/CH2007/000557 filed Nov. 12, 2007, which claims priority to Austrian Application No. A 1866/2006 filed Nov. 10, 2006.

TECHNICAL FIELD

The invention relates to a pressure sensor for measurement in hot, dynamic processes comprising a cylindrical housing in which a measuring element is located as well as a round or annular membrane having at least one outer support wherein the outer support is arranged on the housing offset behind a housing extension, according to the characterizing part of the first claim.

BACKGROUND

Measurement in hot, dynamic processes is often subject to measurement errors originating from thermally induced deformations of the sensor front. Since the measuring elements within the sensors detect measurement data due to an axial displacement of the membrane, erroneous measurements result from tilting of the membrane clamping.

Ignitions in combustion chambers, for example engines, induce momentary, cyclic temperature peaks, sometimes of more than 2000 K. To be able to measure pressures in such combustion chambers it is essential that these high, temporary temperature variations do not cause any measurement errors. For this purpose, metallic grids are inserted for example in assembly bores in front of the sensors that act as flame protectors. A disadvantage of such systems is that these grids must be laboriously removed from said bores during dismounting of the sensors.

OBJECT AND BRIEF SUMMARY OF THE INVENTION

The object of the present invention is to suggest a pressure sensor of the type mentioned in the beginning which is insensitive to temporary temperature peaks.

The object has been achieved by providing the housing projection with a heat shield which, except at its edges, is arranged in an interspaced manner. In this way, heating of the sensor tip and, thus, radial expansion of the housing extension is reduced which results in less distortion and tension of the membrane and eventually in less measurement error.

The thermal deformations of the sensor components are inevitable. In order to avoid measurement errors, an impact thereof on the measurement signal must be avoided as much as possible.

Deformation essentially results from two effects. On the one hand a temperature-caused deformation of the membrane produces forces which act on and deform the support. These deformations again result in a force that acts on the membrane. On the other hand the support itself is heated and is distorted by its expansion.

The heated membrane is restrained in its thermal expansion by the supports and, thus, generates large radial forces. These forces have no impact on the measuring element which operates axially if the membrane is accurately aligned in a radial direction. However, in the usual construction of supports of measuring elements also the support is distorted/twisted and thus distorts the membrane as well. From this deformation result axial displacements between the membrane region which is located radially inward and that which is facing outward. The present invention avoids such a distortion of the supports.

SHORT DESCRIPTION OF THE FIGURES

Figure 2:
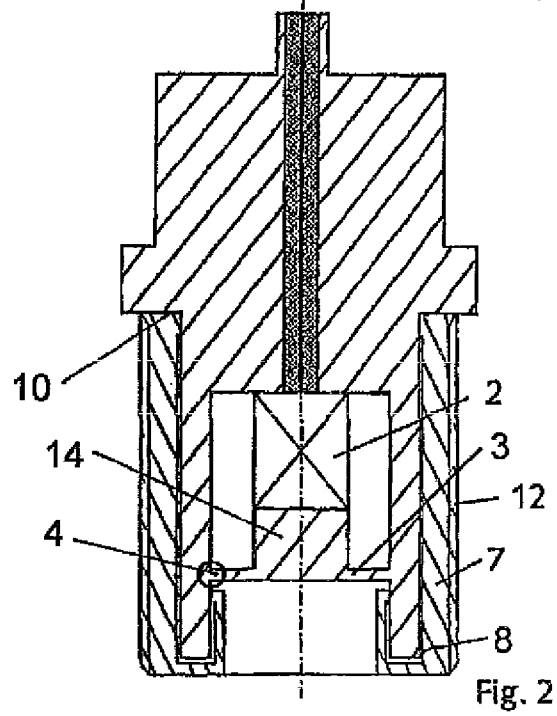
Figure 3:
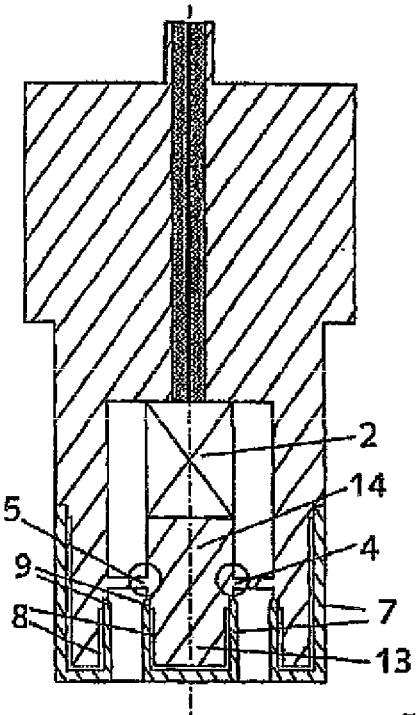

In the followings the invention will be explained in more detail with respect to the drawings which show FIG. 1 a representation of a pressure sensor according to the invention in cross-section mounted in a device on one side;

FIG. 2 an alternative representation of a pressure sensor according to the invention in cross-section having an external thread at the heat shield;

FIG. 3 another alternative representation of a pressure sensor according to the invention in cross-section having a plunger on the membrane, protected by a heat shield.

DETAILED DESCRIPTION OF EXEMPLARY EMBODIMENTS

FIG. 1 shows a representation of a pressure sensor according to the invention for the measurement in hot, dynamic processes in cross-section built into a device 16 on one side. In front of the sensor there is for example a combustion chamber 15, the pressures of which are to be measured by the sensor.

The sensor comprises a housing 1 in which a measuring element 2 is disposed as well as a round membrane 3 having an outer support 4. This support 4 can be considered as a hinge around which the membrane 3 can pivot. The measuring element can capture measurement data due to an axial displacement of the membrane 3. Therefore, axial displacements which do not result from a pressure differential in the combustion chamber 15 but from thermal expansion of sensor components produce an erroneous measurement. However, radial expansions of the membrane 3 do not cause a measurement error.

The support 4 on the housing 1 is arranged in an offset manner behind a housing extension 6. In this way the effect of heat on the membrane 3 is already smaller as if the membrane were mounted frontally on the housing 1.

According to the invention the housing extension 6 is provided with a heat shield which is arranged, except at its edges 9, interspaced behind a gap 8. The heat shield 7 is made of a material that can withstand temperatures of more than 600° C., for example of steel. Due to the relatively high thermal conductivity of metals as compared to heat-insulating materials the heat is quickly dissipated and can be conducted towards the outside. The basic mode of action of the heat shield 7 is, however, to create a heat barrier, i.e. the gap 8, having a very low thermal conductivity. Therefore, heat is transmitted from the heat shield 7 to the housing extension 6 mainly by means of radiation which is several orders of magnitude lower than heat transmission by thermal conduction. Only at its edges 9, the heat shield 7 is in contact with the housing 1. One of the edges 9 is in immediate proximity to the outer support 4. The other edge 9 is located on the outside of the housing 1. At this outer side of the housing 1 there may be provided a thread 12 that enables shoulder-sealing mounting of the sensor into a bore of the device 16. For this purpose, a recess 10 is provided against which the sensor sealingly abuts.

The edges 9 of the heat shield 7 are preferably arranged on the housing 1 in an imperviously welded manner so that during a combustion in the combustion chamber 15 no hot gasses can enter into the gap 8. A leaky point would allow for unidirectional gas leakage thus causing unidirectional heating of the housing protrusion 6 and an asymmetrical expansion thereof. This in turn results in a distortion of the membrane leading to a measurement error.

All of the features described herein also apply to the descriptions in FIGS. 2 and 3 which have the same designations as in FIG. 1.

In all assemblies, the measuring element 2 can be, in particular, a piezoelectric, piezoresistive, capacitive, inductive, or optical measuring element 2 or a strain gauge. The assembly represented in FIGS. 1-3 corresponds to a piezoelectric measuring element 2 supported on the membrane 3 via a pressure plate 14. Pressure sensors having other measuring elements are constructed accordingly but are not different with respect to the other features described. In particular, they also comprise the membrane 3 having the outer support 4 and the heat shield 7 that is arranged in an interspaced manner.

Preferably, the measuring element 2 can be seated in its own measurement insert (not shown) arranged in a hollow space in the housing 1. Preferably, this measurement insert can be a bushing that provides the preload of the measuring element. It is attached close to the membrane in the area of the membrane support where no large deformations of the housing occur. In this way, the support 4 is also protected from deformations of the mounting site.

FIG. 2 describes a pressure sensor as in FIG. 1 wherein only the thread 12 for the mounting of the sensor in a bore 11 is provided directly at the heat shield 7. Accordingly, the heat shield 7 is made thicker in this external region than in the internal region. For this purpose, the heat shield 7 extends farther to the rear side in the direction of the recess 10 on the outer side of the housing 1. The direct contact between heat shield 7 and device 16 improves the dissipation of heat from the hot areas.

FIG. 3 also corresponds to FIG. 1 wherein in this arrangement the membrane is made in an annular shape. Thus, the membrane 3 additionally has an internal support 5 to which a plunger 13 is attached. This plunger is arranged within the housing extension 6 and is also provided with a heat shield 7 of the kind described above. Particularly, also this heat shield is arranged, except at its edges, in an interspaced manner. This arrangement is preferred because the major part of the membrane now is very well protected from heat by the plunger 13 and the heat shield 7. The remaining portion of the membrane now is offset, i.e. protected, and smaller which results in less distortions and tensions. It is particularly advantageous to imperviously seal also the edges 9 of this second heat shield by welding.

LIST OF REFERENCE NUMERALS

1 housing
2 measuring element
3 membrane
4 (outer) support
5 (inner) support
6 housing extension
7 heat shield
8 gap
9 edge, attachment site
10 recess
11 bore
12 thread
13 plunger
14 pressure plate
15 combustion chamber
16 device

The invention claimed is:

1. A pressure sensor for measurement in hot, dynamic processes comprising:
 a cylindrical housing defining a front end that is configured to be disposed toward the locus of the hot, dynamic processes when the pressure sensor is taking measurements of the processes, the housing defining a back end disposed opposite the front end, the housing defining an annular shaped housing extension at the housing's front end;
 a round or annular membrane disposed in the housing behind the housing extension so as to be exposed to the hot process when the pressure sensor is taking measurements of the process, the membrane having at least an outer support wherein the outer support is mounted on the housing behind the housing extension;
 a measuring element disposed in the housing between the membrane and the rear end and wherein the measuring element is adapted to acquire measurement data due to an axial displacement of the membrane; and
 an annular heat shield which surrounds the housing extension and, except at the edges of the heat shield, defines a gap between the heat shield and the housing extension.

2. The pressure sensor according to claim 1 wherein the housing is provided with a recess for shoulder-sealing mounting of the sensor.

3. The pressure sensor according to claim 1 wherein the measuring element is a piezoelectric, piezoresistive, capacitive, inductive, or optical measuring element or a strain gauge.

4. The pressure sensor according to claim 1, wherein the heat shield at its outer edge has a thread for mounting the sensor into a bore.

5. The pressure sensor according to claim 1, wherein the membrane has an annular shape and the membrane has an inner support at which a plunger is attached that is arranged within the housing extension and is provided with a heat shield which, except at its edges, is arranged in an interspaced manner.

6. The pressure sensor according to claim 1, wherein the heat shield, except at its edges which are in the region of the support, is imperviously welded.

7. A pressure sensor according to claim 1, wherein the measuring element is seated in a measurement insert wherein the measurement insert is arranged in a hollow space in the housing in the region of the support of the housing and applies a preload on the measuring element.

\* \* \* \* \*